United States Patent
Patel et al.

(10) Patent No.: US 6,805,933 B2
(45) Date of Patent: Oct. 19, 2004

(54) ARTICLES COMPRISING A RELEASE LINER HAVING A HIGH COEFFICIENT OF FRICTION AND GOOD ROLL STABILITY

(75) Inventors: Suman K. Patel, Woodbury, MN (US); Jacob J. Liu, Woodbury, MN (US); Joseph A. Richie, Stillwater, MN (US); Hildegard M. Schneider, Woodbury, MN (US); David L. Bergeson, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/919,113

(22) Filed: Jul. 31, 2001

(65) Prior Publication Data

US 2003/0064188 A1 Apr. 3, 2003

(51) Int. Cl.⁷ ................................................. B32B 5/16
(52) U.S. Cl. ..................... 428/40.1; 428/40.2; 428/41.4; 428/41.8; 428/212; 428/323
(58) Field of Search ............................... 428/40.1, 40.2, 428/41.4, 41.8, 212, 343, 323

(56) References Cited

U.S. PATENT DOCUMENTS

| | | | |
|---|---|---|---|
| 4,025,159 A | | 5/1977 | McGrath |
| 4,923,944 A | * | 5/1990 | Yamada et al. ............... 528/15 |
| 5,432,006 A | * | 7/1995 | Kessel et al. ............... 428/447 |
| 6,054,208 A | * | 4/2000 | Rega et al. ................. 428/323 |
| 6,204,350 B1 | | 3/2001 | Liu et al. |

FOREIGN PATENT DOCUMENTS

| | | |
|---|---|---|
| EP | 0 806 301 | 12/1997 |
| EP | 1 013 732 | 6/2000 |
| JP | 59149970 | * 8/1984 |
| JP | 05287242 | 11/1993 |
| JP | 7-104111 | 4/1995 |
| JP | 07041736 | 10/1995 |
| WO | WO 99/14281 | * 3/1999 |
| WO | WO 00/44842 | 8/2000 |
| WO | WO 00/44843 | 8/2000 |

OTHER PUBLICATIONS

The Science of Golfballs, reprinted at http://www.bs-sports.co.jp/english/ on Oct. 15, 2003.*

* cited by examiner

*Primary Examiner*—Harold Pyon
*Assistant Examiner*—Brian P. Egan
(74) *Attorney, Agent, or Firm*—Carolyn A. Fischer

(57) ABSTRACT

The present invention relates to articles comprising a retroreflective sheeting, a release liner and an adhesive layer sandwiched between the substrate and release liner and methods of manufacturing such articles. The release liner has a relatively high coefficient of friction and has shrinkage properties that are substantially the same as or greater than the retroreflective sheeting. The article exhibits good roll stability, being substantially free of defects when supplied in a roll form.

17 Claims, 3 Drawing Sheets

ARTICLES COMPRISING A RELEASE LINER HAVING A HIGH COEFFICIENT OF FRICTION AND GOOD ROLL STABILITY

FIELD OF THE INVENTION

The present invention relates to articles comprising a substrate, a release liner and an adhesive layer sandwiched between the substrate and release liner and methods of manufacturing such articles. The release liner has a relatively high coefficient of friction and has shrinkage properties that are substantially the same as or greater than the substrate. The article exhibits good roll stability, being substantially free of defects when supplied in a roll form.

BACKGROUND OF THE INVENTION

A variety of articles, such as tapes (e.g. packaging, automotive, medical), labels, sheeting for traffic control signage, and commercial graphic films for advertising and promotional displays comprise an adhesive coated substrate (eg. backing, sheeting) having a release liner temporarily covering the adhesive layer. These articles are typically supplied as sheets or in a roll form. Provided that proper tensioning is employed, it is typically unproblematic to convert dimensionally stable substrates in combination with dimensionally stable release liners.

On the other hand, flexible plastic substrates tend to be much more difficult to convert, often exhibiting roll defects such as wrinkles and buckling. Many of these defects occur during the manufacturing process and are primarily process related. Other defects, appear after manufacturing and prior to use and thus are related primarily to the physical properties of the materials employed as a function of storage conditions as well as interactions of these materials with each other.

WO 99/14281 relates to a release liner for use with a pressure sensitive adhesive. The release liner includes a film of a thermoplastic elastomeric olefin. At p. 14, this reference states that "The release liner of the invention preferably exhibits substantially no shrinking or buckling when brought to room temperature after being exposed to an elevated temperature for an extended period of time. A preferred liner exhibits substantially no shrinking or buckling when brought to room temperature (i.e., about 20–25° C.) after being exposed to a temperature of about 90° C., more preferably about 120° C., and most preferably about 150° C., for a period of about one-half hour, more preferably about one hour. Shrinking and buckling can be avoided by selecting a release liner having thermal expansion and contraction coefficients substantially similar to those of the intended substrate."

It is generally known and appreciated by those of ordinary skill in the art that a combination of substrate, adhesive and release liner that exhibits good roll stability can exhibit roll defects upon replacing either the substrate or the liner with a different material. For example, "Scotchlite High Intensity Grade Reflective Sheeting Series 3870", commercially available from Minnesota, Mining and Manufacturing Company ("3M"), St. Paul, Minn. employs an "encapsulated lens" type retroreflective sheeting, generally prepared as described in U.S. Pat. No. 4,025,159. This sheeting employs a polymethylmethacrylate cover film in combination with a thermally crosslinked adhesive and a release liner having a relatively low coefficient of friction. Although this combination of substrate, adhesive, and liner exhibits good roll stability, roll defects became evident in attempting to replace the liner with an alternative material.

SUMMARY OF THE INVENTION

The present inventors have discovered that "shrinkage" is an important factor in preventing roll defects that occur post-manufacturing during storage. Accordingly, an object of the present invention is to provide an article comprising an adhesive sandwiched between a substrate and release liner that exhibits good roll stability. Another object of the invention is to provide a retroreflective article comprising an adhesive sandwiched between a substrate and release liner wherein the article or the adhesive in combination with the liner can be subjected to electron beam radiant energy and maintain sufficiently low release values.

In one aspect, the present invention is an article comprising an adhesive layer disposed between a substrate and a liner. The liner is releasably adhered to the adhesive and has a relatively high coefficient of friction, of at least about 0.30. The substrate exhibits shrinkage and the liner exhibits a shrinkage ranging from substantially the same as to greater than the substrate.

The coefficient of friction of the liner is preferably at least about 0.40, more preferably at least about 0.45, and most preferably at least about 0.50.

The substrate is preferably a film comprising acrylic, poly(vinyl chloride), poly(vinyl fluoride), polyurethane, polyolefin, polyester, and combinations thereof with acrylic such as polymethymethacrylate and polyolefin being most preferred.

The force per unit width of the substrate is preferably at least two to three times greater than the liner. In preferred embodiments the force per unit width of the substrate is at least $1 \times 10^3$ Newtons/cm greater and more preferably $1 \times 10^4$ Newtons/cm greater than the liner.

The adhesive is preferably heat-stable and preferably crosslinked such as acrylate based pressure sensitive adhesive compositions. The preferred adhesive compositions are crosslinked with an electron beam radiant energy source and thus are substantially free of photoinitiator.

The substrate is preferably retroreflective sheeting such as enclosed-lens, encapsulated lens, and cube-corner type retroreflective sheeting with encapsulated lens type being most preferred.

The release liner preferably comprises a backing and a release coating composition comprising a cure-on-demand moisture curable composition having reactive silane functionality. The moisture-curable release composition comprises a compound comprising molecules bearing reactive silane functional groups and an acid generating material that is free of ammonium salt.

In another aspect, the invention provides an article comprising an adhesive layer disposed between a retroreflective substrate and a liner, wherein the adhesive-facing surface of the liner has a coefficient of friction of at least about 0.30.

In another aspect, the present invention is a method of making an article comprising:

a) providing a substrate that exhibits shrinkage;
b) providing a liner that exhibits shrinkage ranging from substantially the same as the substrate to greater than the substrate and a coefficient of friction of greater than 0.30;
c) coating the substrate with an adhesive composition;
d) contacting the liner to the adhesive composition forming an article; and
e) winding the article into a roll.

In another aspect, the method of making the article comprises:

a) providing a substrate that exhibits shrinkage;
b) providing a liner that exhibits shrinkage ranging from substantially the same as the substrate to greater than the substrate and a coefficient of friction of greater than 0.30;
c) coating the liner with an adhesive composition;
d) contacting the substrate to the adhesive composition forming an article; and
e) winding the article into a roll.

In another aspect, the method of making the article comprises:

a) providing a substrate that exhibits shrinkage;
b) providing a first liner;
c) coating the first liner with an adhesive composition;
d) contacting the substrate to the adhesive composition;
e) stripping the first liner exposing the adhesive;
f) contacting the adhesive to a second liner that exhibits shrinkage ranging from substantially the same as the substrate to greater than the substrate and a coefficient of friction of greater than 0.30 forming an article; and
e) winding the article into a roll.

Each of these methods preferably further comprise exposing the adhesive to an electron beam energy source.

DESCRIPTION OF THE DRAWINGS

FIG. 1 illustrates that Liner 4 and Liner 6 exhibit thermal expansion most similar to that of the substrate (Sheeting 3870 with adhesive), whereas Liners 1 and 2, exhibit a thermal expansion less similar to the substrate.

In FIG. 2, the shrinkage was measured using another Dynamic Mechanical Analysis (DMA) technique, as described in further detail in the forthcoming examples. In FIG. 3, the shrinkage was measured using a laser interferometer and a ball slide stage, as described in further detail in the forthcoming examples. FIG. 2 depicts shrinkage at a constant temperature over a shorter duration of time, ranging up to 1200 minutes, whereas FIG. 3 depicts the shrinkage at a constant temperature over a longer time span, up to 60 days. Both figures depict that Liner 1 and 2 exhibit shrinkage substantially greater than the adhesive coated substrate ("Sheeting 3870"), whereas Liner 5 and Liner 6 exhibit less shrinkage than the substrate.

DETAILED DESCRIPTION OF THE INVENTION

Figure 1:
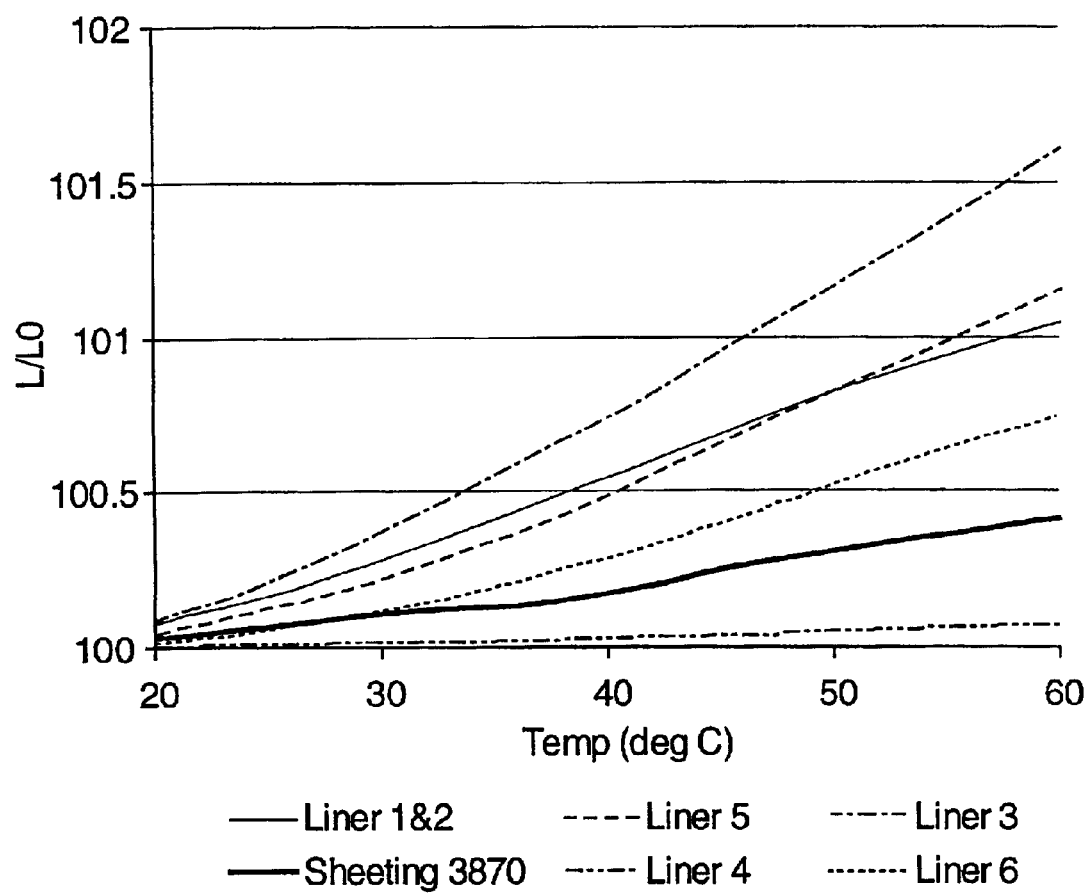
FIG. 1 depicts the thermal expansion of various liners in comparison to an adhesive coated substrate, "Sheeting 3870". The thermal expansion was measured using a Dynamic Mechanical Analysis (DMA) technique, as described in further detail in the forthcoming examples. Since the thermal expansion of the release liner is a function of the release liner backing, the thermal expansion of Liner 1 and Liner 2 is the same since these two liners have the same backing and only differ with regard to the release coating composition as well as the coefficient of friction of the release coating.

The present invention relates to an article comprising a substrate, an adhesive, and a release liner. The adhesive is sandwiched between the substrate and the liner. The adhesive is typically pressure sensitive or alternatively lacks cohesive strength. For instances wherein the adhesive is pressure sensitive, the release liner facilitates handling, prevents contamination, and insures that the adhesive substantially maintains its intended adhesive properties. The liner is typically left in contact with the adhesive layer while the article is being converted, packaged and shipped to the end-user (e.g. sign manufacturer). The liner is then removed from the adhesive layer and the adhesive coated substrate is bonded to a "target substrate", such as a sign backing, billboard, automobile, truck, airplane, building, awning, window, floor, etc. For instances wherein the adhesive lacks cohesive strength, such as in the case of adhesive compositions that are subsequently cured or crosslinked, the liner may provide dimensional stability to the adhesive prior to curing. Alternatively, or in addition thereto, the liner may provide dimensional stability to the substrate, the substrate being formed in-line by curing of a substrate precursor composition.

As used herein the terminology, "substrate" refers to a sheet or film that is capable of being wound around a 3 inch (7.6 cm) core by hand into a roll-form without cracking. The substrate typically ranges in thickness from about 0.01 mm to about 2 mm.

"Adhesive" refers to a material that is capable of being permanently bonded to the substrate and releasably bonded to the liner. "Permanently bonded" means that the adhesive can not be easily physically removed at ambient temperature (25° C.) without damaging the substrate. "Releasably bonded" refers to the ability to cleanly remove the liner from the adhesive without tearing or otherwise damaging the liner, the adhesive layer, or the substrate. The force of removal is typically less than about 400 g/2.5 cm and preferably less than about 200 g/2.5 cm as measured according to ASTM D3330/3330M, Test Method A, Volume 15.09, Summary 1.1.1.

"Liner" and "release liner" are used interchangeably and refer to a sheet or film having at least one surface that is capable of being releasably bonded to the adhesive, as previously described. In the case of double-faced tape, both surfaces of the liner are releasably bonded to the adhesive layer.

The articles of the invention have two major exposed surfaces, the substrate surface and the release liner surface. The substrate surface is also the "viewing surface" in the case of retroreflective sheeting, commercial graphic films, etc. The adhesive is typically permanently bonded to the surface of the substrate opposing the viewing surface. The surface of the adhesive opposing the surface bonded to the substrate is releasably bonded to the liner.

The substrate, adhesive and release liner are chosen such that the combination of such exhibit good roll stability, being substantially free of defects. As used herein "good roll stability" refers to rolls exhibiting a rating less than "3" when prepared by hand and tested according to the Roll Stability test at 120° F. (49° C.) for 10 days, as described in further detail in the forthcoming examples. The articles preferably exhibit good roll stability at 120° F. (49° C.) for an extended duration of time, exhibiting a rating ranging from "1" to "2" at 120° F. (49° C.) for 22 days and longer. Typically, however, the roll stability at 10 days is predictive of the roll stability at the same temperature for longer duration of times. Most preferably, the articles of the present invention exhibit good roll stability at higher storage temperatures ranging up to about 150° F. (66° C.).

Unlike many dimensionally stable materials, the substrate of the present invention is preferably comprised of a material or mixture of materials such that the substrate as a whole exhibits shrinkage. As used herein, "shrinkage" refers to a sheet or film that exhibits a (1-L/LO) of greater than 0.05% at 10 days according to Shrinkage Test B, as described in further detail in the forthcoming examples. In the absence of the present invention, the severity of roll defects tends to increase with increasing shrinkage, wherein the substrate exhibits a shrinkage of greater than about 0.1%, greater than about 0.2%, and greater than about 0.4%. However, in general the shrinkage of the substrate is typically less than about 5% and more typically less than about 2%.

Shrinkage is different from thermal expansion. Whereas, thermal expansion and contraction is generally reversible at least at lower temperatures; shrinkage is irreversible, a function of time and prevalent at lower temperatures, such as evident during storage.

The liner is chosen such that it exhibits substantially the same as or greater shrinkage than the substrate. The physical properties of the liner backing, rather than the release coating, typically dominate the overall physical properties of the liner. As used herein, "substantially the same shrinkage" refers to the difference in shrinkage between the liner and substrate divided by the shrinkage of the substrate is greater than −0.1 based on Shrinkage Test B (10 days at 120° F. [49°]). Further, the present invention provides good roll stability wherein the difference in shrinkage between the liner and substrate divided by the shrinkage of the substrate is greater than about 0, greater than about 1 and greater than 2.

In general, as the modulus of the liner increases, the importance of shrinkage to roll stability increases. Good roll stability can also be achieved by using a low modulus liner. Low modulus liners often exhibit a greater amount of creep in comparison to a higher modulus liner and thus, can more easily accommodate the shrinkage of the substrate without the formation of visible roll defects.

The substrate is substantially stronger in comparison to the liner. The force per unit width, as measured according to ASTM D-882 (using a gap of 25 cm, a sample width of 1 inch (2.5 cm) and a rate of 2.5 cm/min), tends to be a useful physical property for comparing the relative strength of the substrate to the liner. The force per lineal inch (2.5 cm) of the substrate (e.g. single film, multi-layer film, retroreflective sheeting) tends to range from about $1\times10^3$ Newtons/cm to about $1\times10^6$ Newtons/cm. At a lower force per unit width, the substrate tends to stretch or distort during manufacturing or the substrate can tear upon removal of the liner, whereas at a higher force per unit width the substrate tends to be too stiff to be wound into a roll at preferred substrate film thicknesses of less than 10 mils (250 microns).

The force per unit width of the liner tends to be several orders of magnitude lower than the substrate. In general, the force per unit width of the substrate is at least two to three times greater than the liner. In preferred embodiments the force per unit width of the substrate is at least $1\times10^3$ Newtons/cm greater and preferably $1\times10^4$ Newtons/cm greater than the liner. If however, one were to use a liner having approximately the same force per unit width as the substrate, the liner should be chosen such that it exhibits substantially the same shrinkage as the substrate.

Since the adhesive layer of the article tends to be the "weakest link", the physical properties of the adhesive, such as shrinkage, have substantially no effect on roll stability in view of the adhesive having lower strength in comparison to both the substrate and liner. The adhesive tends to yield to accommodate the shrinkage of either the substrate and/or liner. Accordingly, the shrinkage of the substrate is equal to the shrinkage of an adhesive coated substrate, per FIGS. 2 and 3. If, however, a highly crosslinked adhesive were employed, the shrinkage of the adhesive would become increasingly important. In such instances, the Applicants surmise that it would be important to select an adhesive having shrinkage properties substantially the same as the liner and/or substrate.

In addition to the requisite shrinkage, the release liner is chosen such that the surface that is in contact with the adhesive has a relatively high coefficient of friction. The coefficient of friction, as measured according to ASTM D 1894-63, subprocedure A, as described in further detail in the forthcoming examples, is at least about 0.30. Further, the coefficient of friction is generally less than about 2. The coefficient of friction is preferably at least about 0.40, more preferably at least about 0.45, and most preferably at least about 0.50. The Applicants have found that release liners having a relatively low coefficient of friction exhibit too high of a release in instances wherein the release liner in combination with the adhesive were exposed to an electron beam (EB) radiant energy source. EB is often used in curing processes of either the substrate and/or the adhesive to build the tensile or cohesive strength of such materials. Further, EB is also used to sterilize materials such as bandages and medical tapes. Materials (e.g. adhesive, substrate precursor compositions) that are EB cured, rather than UV cured are typically substantially free of photoinitiator, having less than 0.1% photoinitiator present after curing.

Provided that the substrate exhibits shrinkage, as previously described, a wide variety of materials are suitable for use as the substrate in the article of the invention including various films comprised of thermoplastic polymeric materials. Such thermoplastic materials may comprise reactive groups that crosslink during manufacturing by means of heat (i.e. thermosetting) or a radiant energy source (ultraviolet [UV], EB). The films are typically nonporous. However, microporous, apertured, as well as materials further comprising water-absorbing particles such as silica and/or superabsorbent polymers, may also be employed. Other suitable substrates include woven and nonwoven fabrics.

Representative examples of polymeric materials (e.g. sheet, films) for use as the substrate in the invention include acrylic-containing films (e.g. poly(methyl) methacrylate [PMMA], copolymers and terpolymers of PMMA), poly(vinyl chloride)-containing films, (e.g., vinyl, polymeric materialized vinyl, reinforced vinyl, vinyl/acrylic blends, plasticized vinyl), poly(vinyl fluoride) containing films, urethane-containing films, polyolefin-containing films and polyester-containing films. Further, the substrate may comprise copolymers of such polymeric species. In particular, films comprising PMMA and polyolefin are especially prone to shrinkage.

The shrinkage of the substrate is dependent on the composition of the substrate as well as the method of manufacture and manufacturing conditions (e.g. temperature). Accordingly, films prepared from the same compositions may vary in shrinkage depending on the processing conditions such as temperature, quench rate, etc.

Depending on the intended end use, the substrates for use in the invention may be clear, translucent, or opaque. Additionally, the substrate may be transmissive, reflective, or retroreflective.

The substrate may be a single film, a multi-layer film, or a composite of one or more film layer(s) in combination with other materials such as adhesive layers, color layers, etc. A preferred substrate for use in the invention is retroreflective sheeting. The two most common types of retroreflective sheeting are microsphere-based sheeting and cube corner-based sheeting. Microsphere sheeting, sometimes referred to as "beaded sheeting," is well known to the art and includes a multitude of microspheres typically at least partially embedded in a binder layer, and associated specular or diffuse reflecting materials (such as metallic vapor or sputter coatings, metal flakes, or pigment particles). "Enclosed-lens" based sheeting refers to retroreflective sheeting in which the beads are in spaced relationship to the reflector but in full contact with resin. The "encapsulated lens" retroreflective sheeting is designed such that the reflector is in direct contact with the bead but the opposite side of the bead is in a gas interface. Illustrative examples of microsphere-based sheeting are disclosed in U.S. Pat. Nos. 4,025,159 (McGrath); 4,983,436 (Bailey); 5,064,272 (Bailey); 5,066,098 (Kult); 5,069,964 (Tolliver); and 5,262,225 (Wilson).

Cube corner sheeting, sometimes referred to as prismatic, microprismatic, triple mirror or total internal reflection sheetings, typically include a multitude of cube corner elements to retroreflect incident light. Cube corner retroreflectors typically include a sheet having a generally planar front surface and an array of cube corner elements protruding from the back surface. Cube corner reflecting elements include generally trihedral structures that have three approximately mutually perpendicular lateral faces meeting in a single corner—a cube corner. In use, the retroreflector is arranged with the front surface disposed generally toward the anticipated location of intended observers and the light source. Light incident on the front surface enters the sheet and passes through the body of the sheet to be reflected by each of the three faces of the elements, so as to exit the front surface in a direction substantially toward the light source. In the case of total internal reflection, the air interface must remain free of dirt, water and adhesive and therefore is enclosed by a sealing film. The light rays are typically reflected at the lateral faces due to total internal reflection, or by reflective coatings, as previously described, on the back side of the lateral faces. Preferred polymers for cube corner sheeting include poly(carbonate), poly(methyl methacrylate), poly(ethylene terephthalate), aliphatic polyurethanes, as well as ethylene copolymers and ionomers thereof. Cube corner sheeting may be prepared by casting directly onto a film, such as described in U.S. Pat. No. 5,691,846 (Benson, Jr.) incorporated herein by reference. Preferred polymers for radiation cured cube corners include cross-linked acrylates such as multifunctional acrylates or epoxies and acrylated urethanes blended with mono-and multifunctional monomers. Further, cube corners such as those previously described may be cast on to plasticized polyvinyl chloride film for more flexible cast cube corner sheeting. These polymers are preferred for one or more reasons including thermal stability, environmental stability, clarity, excellent release from the tooling or mold, and capability of receiving a reflective coating.

In embodiments wherein the sheeting is likely to be exposed to moisture, the cube corner retroreflective elements are preferably encapsulated with a seal film. In instances wherein cube corner sheeting is employed as the retroreflective layer, a backing layer may be present for the purpose of opacifying the article or article, improving the scratch and gouge resistance thereof, and/or eliminating the blocking tendencies of the seal film. Illustrative examples of cube corner-based retroreflective sheeting are disclosed in U.S. Pat. Nos. 5,138,488 (Szczech); 5,387,458 (Pavelka); 5,450,235 (Smith); 5,605,761 (Burns); 5,614,286 (Bacon Jr.) and 5,691,846 (Benson, Jr.).

The coefficient of retroreflection of the retroreflective layer varies depending on the desired properties of the finished article. In general, however, the retroreflective layer typically has a coefficient of retroreflection ranging from about 5 candelas per lux per square meter, for colored retroreflective layers, to about 1500 candelas per lux per square meter at 0.2 degree observation angle and −4 degree entrance angle, as measured according to ASTM E-810 test method for coefficient of retroreflection of retroreflective sheeting. For cube corner sheeting the coefficient of retroreflection is preferably at least about 200 candelas per lux per square meter for fluorescent orange and at least about 550 candelas per lux per square meter for white. For Type I white sheetings ("engineering grade"), the minimum coefficient of retroreflection is 70 cd/fc/ft$^2$, whereas for Type III white sheetings ("high intensity") the minimum coefficient of retroreflection is 250 cd/fc/ft$^2$.

In a preferred embodiment the substrate is a retroreflective sheeting comprising polymethylmethacrylate, either as a cover film on an encapsulated lens type sheeting or as the retroreflective layer of a cube corner type retroreflective sheeting.

In general and in particular for commercial graphic films, the substrate may further comprise an image reception layer (e.g. ink receptive layer). The image reception layer may be disposed on the exposed surface of the viewing surface of the article. Alternatively, the image reception layer may be buried in the construction, being disposed on the unexposed surface of a cover film. In such instances the image reception layer of the cover film is typically reverse imaged prior to being bonded to the viewing surface. A preferred image reception layer comprising an acid- or acid/acrylate modified ethylene vinyl acetate resin, as disclosed in U.S. Pat. No. 5,721,086 (Emslander et al.). The image reception layer comprises a polymer comprising at least two monoethylenically unsaturated monomeric units, wherein one monomeric unit comprises a substituted alkene where each branch comprises from 0 to about 8 carbon atoms and wherein one other monomeric unit comprises a (meth)acrylic acid ester of a nontertiary alkyl alcohol in which the alkyl group contains from 1 to about 12 carbon atoms and can include heteroatoms in the alkyl chain and in which the alcohol can be linear, branched, or cyclic in nature.

Commercially available films, suitable for use as the substrate, include a multitude of films typically used for signage and commercial graphic uses such as available from 3M under the trade designations of "Panaflex", "Nomad", "Scotchcal", "Scotchlite", "Controltac", and "Controltac Plus".

A wide variety of adhesive compositions are suitable for use in the invention. The adhesive composition is preferably pressure sensitive. Various pressure sensitive adhesives are known in the art and are described in the patent literature. Representative pressure-sensitive adhesive compositions include compositions based on acrylate or acrylics, natural rubber, tackified block copolymers, polyvinyl acetate, ethylene vinyl acetate, polyesters, polyurethanes, silicones, etc., as well as themosetting adhesives such as epoxy acrylate and epoxy polyesters.

The adhesive is preferably heat-stable such as acrylate pressure sensitive adhesives described in Re 24906 (Ulrich); U.S. Pat. Nos. 4,181,752 (Martens et al.) 4,818,610 (Zimmerman et al.) and 5,804,610 (Hamer) as well as silicone pressure sensitive adhesive. Preferred adhesive compositions for use with retroreflective substrates include adhesive compositions described in U.S. Pat. No. 5,861,211 (Thakkar), WO 95/26281 (Thakkar) and WO 98/17466 (Thakker), incorporated herein by reference.

The adhesive can be prepared by any of the known methods including emulsion polymerization, solvent polymerization, as well as solventless polymerization. Typically acrylate adhesives comprise homopolymers and copolymers of monofunctional unsaturated acrylic or methacrylic acid ester monomer of non-tertiary alcohols having from about 1 to about 20 carbon atoms, and preferably from about 4 to 12 carbon atoms. A comonomer may be optionally included to improve the strength of the adhesive. Such reinforcing comonomers typically have a higher homopolymer glass transition temperature than the acrylic acid ester homopolymer.

Suitable acrylic acid ester monomer include 2-ethylhexyl acrylate, isooctyl acrylate, isononyl acrylate, n-butyl acrylate, decyl acrylate, dodecyl acrylate, octadecyl acrylate, and mixtures thereof. Useful reinforcing comonomers include acrylic acid methacrylic acid, itaconic acid, acrylamide, substituted acrylamines, N-vinyl pyrrolidone, N-vinyl caprolactam, isobornyl acrylate, and cyclohexyl acrylate.

The surface of the adhesive layer opposing the surface bonded to the substrate is releasably adhered to a liner. The liner typically comprises a backing and a release coating composition coated on the surface of the backing that is in contact with the adhesive. The backing is typically a sheet or film comprised of a thermoplastic material such as those previously described with regard to the substrate. Although the composition of the substrate and the liner backing may be the same, the liner is typically a different material, that is substantially weaker in strength than the substrate, as previously described. A preferred liner backing for use with PMMA substrate is a polyolefin, such as a polypropylene copolymer. The thickness of the backing generally ranges from about 10 microns to 300 microns.

A release coating is generally provided as a continuous surface layer at a thickness ranging from 0.1 micron to 3 microns. Alternatively, the liner may be comprised of a backing material that provides the requisite release properties in the absence of a release coating.

The liner (i.e. liner backing) exhibits shrinkage that is substantially the same as or greater than the substrate as well as has a relatively high coefficient of friction, as previously described. Even though the release liner has a relatively high coefficient of friction, the level of release is still relatively low. The release of the liner, as measured according to ASTM D3330/3330M, Test Method A, (Volume 15.09, Summary 1.1.1) is less than about 200 g/2.5 cm and greater than about 10 g/2.5 cm. Preferably the release of liner is less than about 150 g/2.5 cm, more preferably less than about 100 g/2.5 cm, even more preferably less than about 75 g/2.5 cm, and even more preferably about 50 g/2.5 cm or less. The release liner typically has a release of at least about 10 g/2.5 cm to insure the release liner does not fall off prior to removal by the end user.

The crosslink density of the silicone network is one of the factors which affect the release characteristics of a given silicone. In general, the higher the crosslink density of the silicone, the lower the release force. (*Handbook of Pressure Sensitive Adhesive Technology*, Donatas Satas, Satas & Associates, 1999, pp. 655) Crosslink density can be determined by degree of polymerization (DP) or repeating units between crosslinks which is calculated by the average molecular weight divided by the product of the number of crosslinking functionalities per chain multiplied by the molecular weight of the repeating unit.

Siloxane coatings with a high crosslink density exhibit a high coefficient of friction (COF) while siloxane coatings with a low crosslink density tend to exhibit a low coefficient of friction (COF). The coefficient of friction is also related to the thickness, surface morphology and method of application. Whereas previously employed release liners for use with retroreflective substrates tend to have a coefficient of friction of less than about 0.25 and a corresponding theoretical degree of polymerization of about 5000 or greater, the preferred release liner compositions of the present invention typically have a theoretical degree of polymerization of less than 3500, more preferably less than 1000, and even more preferably less than 500.

A wide variety of release coatings compositions are known and are suitable for use in the invention provided that such coating provide the requisite coefficient of friction and release. Release coating compositions generally comprise low surface energy materials such as polyethylene, polypropylene, fluorocarbons, silicone and combination thereof are known. For example, epoxy silicones are disclosed in U.S. Pat. Nos. 4,822,687 (Kessel et al.), 5,217,805 (Kessel et al.), 5,576,356 (Kessel et al., 5,332,797 (Kessel et al.); perfluoropolyethers are disclosed in U.S. Pat. No. 4,830,910 (Larson), fluorocarbons in a polymer matrix are disclosed in U.S. Pat. No. 5,110,667 (Galick et al.) and various types of silicones are described in U.S. Pat. Nos. 2,588,367 (Dennett), 3,960,810 (Chandra et al.), 4,162,356 (Grenoble), 4,306,050 (Koerner et al.); British Patent No. 1,375,792, (Colquhoun et al.), and German Patent No. 2,736,499 (Hockemeyer), each of which is incorporated herein by reference.

Further, commercially available release coating compositions are available from various suppliers such as General Electric Co. (Albany, N.Y.), Dow Corning under the SYL-OFF tradename, (Midland, Mich.), Wacker Chemie (Germany), and Th. Goldschmidt AC (Germany). Coatings are commercially available from Akrosil (Menasha, Wis.), and Loparex (Willowbrook, Ill.).

A preferred release coating is a cure-on-demand moisture curable composition comprising molecules bearing reactive silane functional groups and an acid generating material that is preferably free of ammonium salt, as described in U.S. Pat. No. 6,204,350, incorporated herein by reference. Preferably, the reactive silane functional groups are the only acid curable groups present in the composition.

The preferred release coatings comprise polydimethyl siloxane (PDMS), crosslinker, and photo acid generator.

The preferred polydimethyl siloxane comprises silanol terminated PDMS [HO(SiMe$_2$O)$_n$SiMe$_2$OH] with a relatively low molecular weight. The preferred molecular weight ranges from about 200 to 5000 g/mole with about 300 to 2000 g/mole being more preferred. The most preferred molecular weight range in 400 to 1500 g/mole.

Crosslinkers include molecules bearing reactive silane functional groups which may be represented by the following structure:

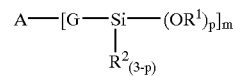

wherein moiety A is an m-valent radical selected from fluoroalkyl radicals, fluoroaryl radicals, and polymeric radicals comprising a polymer selected from polysiloxane, polyolefin, polyester, polyphosphazene, fluorosilicone, fluorinated polyacrylate, fluorinated polyether, fluorinated polyester, and derivatives and combinations thereof;

p is an integer from 1 to 3;
m is an integer greater than or equal to 1;
each $R^1$ is individually selected from alkyl radicals and acyl radicals;
each $R^2$ is individually selected from hydrogen, alkyl radicals, acyl radicals and aryl radicals; and
G is an optional linking moiety which, when present, links radical A to the reactive silane functional groups.

The reactive silane groups typically comprise a silicon atom bonded to one or more acyloxy or alkoxy groups. The average reactive silane functionality of the moisture curable composition is greater than 2 so as to form a crosslinked network upon curing.

The preferred crosslinkers include alkoxy silane containing silicones and alkoxy silane containing saturated olefins. The most preferred crosslinkers comprise bisalkoxysilyl alkanes, general represented by following structures:

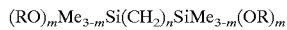
$(RO)_m Me_{3-m} Si(CH_2)_n SiMe_{3-m}(OR)_m$

A wide variety of acid generating materials can be used in the practice of the invention to catalyze the moisture curing reaction, including onium salts such as sulfonium and iodonium salts. Activating the acid generating material liberates an acid that initiates and accelerates crosslinking of the moisture-curable composition through the formation of Si—O—Si crosslinks. Activation may be accomplished by irradiating the composition with, for example, ultraviolet, visible light, EB or microwave radiation. While heat may be used to activate the acid generating material, the compositions of the invention advantageously do not require this and thereby can avoid undesirable damage to heat sensitive substrates.

Other release coating compositions that also would be expected to exhibit the desired COF based on the theoretical degree of polymerization include solventless platinum silicone.

The articles of the invention can be prepared with any of a variety of known methods. The adhesive is either coated directly onto the substrate or coated directly onto the liner. The substrate and liner are most commonly provided as pre-manufactured roll-goods. Alternatively, the substrate or liner may be made in-line by coating a substrate or liner pre-cursor composition onto a release coated belt, roller, etc. By "precursor composition", it is meant that the composition is substantially weaker in strength in comparison to its strength in the finished article, the finished article being the substrate/adhesive/liner composite. For example, the precursor composition may be an extruded thermoplastic material that merely requires cooling to sufficiently build in strength and/or a material that is crosslinked or cured by means of a chemical reaction induced by heat, moisture or radiant energy. In addition, rather than applying the adhesive directly to the substrate, the adhesive may first be applied to an intermediate material, such as a release coated roller or intermediate liner, and then transfer coated onto the substrate or liner of the article.

The articles of the invention comprising an adhesive sandwiched between a substrate and a release liner may be finished products or an intermediate. The release liner is removed and the pressure sensitive adhesive coated surface of the substrate is applied to a target surface. For various retroreflective uses, the target surface is often a barrel, cone, post, roadway, license plate, barricade, or sign backing. In the case of commercial graphics films, the substrate is typically imaged and applied to a building, automobile, airplane etc. Further, the invention finds utility for various tapes and label (e.g. packaging, automotive, medical) that employ substrates that exhibit shrinkage.

EXAMPLES

Objects and advantages of the invention are further illustrated by the following examples, but the particular materials and amounts thereof recited in the examples, as well as other conditions and details, should not be construed to unduly limit the invention. All percentages and ratios herein are by weight unless otherwise specified.

Test Methods Used in the Examples
Coefficient of Friction ("COF")

The Coefficient of Friction of release coatings was determined using a Slip/Peel Tester commercially available from IMASS, Inc., Accord (Hingham), Mass. ("IMASS") under the trade designations "Model SP-102B-3M90" and "Model SP-2000" and following the procedure based on ASTM D 1894-63, subprocedure A. An approximately 25×15 cm (10×6 inch) area of release-coated backings was adhered to the platform of the Slip/Peel Tester such that the release-coated surface was exposed. Care was taken to insure that the release-coated surface was untouched, uncontaminated, flat, and free of wrinkles. Both the release surface and friction sled (wrapped with 3.2 mm thick medium density foam rubber, commercially available from IMASS under the trade designation "Model SP-101038") were blown with compressed air to remove any loose debris. The friction sled was placed on the release-coated surface, and the chain attached to the sled was affixed to the force transducer of the Slip/Peel Tester. The platform of the Slip/Peel Tester was set in motion at a speed of 15 cm/min (6 in/min), thereby dragging the friction sled across the release-coated surface. The instrument calculated and reported the average kinetic friction force, omitting the static friction force. The kinetic coefficient of friction was obtained by dividing the kinetic friction force by the weight of the friction sled.

Thermal Expansion

Thermal Expansion of samples was measured using a Dynamic Mechanical Analyzer commercially available from Perkin-Elmer Corporation, Norwalk, Conn. under the trade designation "Model DMA-7e". Each sample was cut such that it was approximately 5.5 mm wide in the transverse (i.e., cross web) direction by 2.5 cm long in the machine direction (with respect to the direction the substrate or liner was manufactured). The sample was tested in the machine direction with an applied load of 8.8 Newtons per meter (N/m; 0.05 lb./lineal inch). As the sample was being tested, the temperature was increased from about 18° C. to 60° C. at a rate of 1° C. per minute.

Shrinkage

"Shrinkage Test Method A"

The amount of shrinkage occurring on samples initially at room temperature (about 20° C.) and then subjected to 68° C. (154° F.) for about 1200 minutes was measured. The samples were prepared as described for the Thermal Expansion Test Method. Each sample was tested in the machine direction using the Perkin-Elmer Model DMA-7e Analyzer with an applied load of 8.8 N/m. Each sample was held for 1 hour at 18° C., at which time the temperature was increased to 68° C. at a rate of 0.5° C. per minute, and then held at 68° C. for 1200 minutes.

"Shrinkage Test Method B"

The amount of shrinkage occurring on samples was measured using a laser interferometer and a ball slide stage. Each sample was cut such that it was approximately 2.5 cm wide in the transverse direction by 30 cm long in the machine direction. Each sample was tested in the machine direction (with respect to how the substrate was manufactured) by accurately measuring the sample length and then subjecting the sample to 66° C. (150° F.) for the specified amount of time and then measuring the length of the sample.

Roll Stability

Roll stability was evaluated by visual inspection of articles in roll form. A liner/adhesive/substrate construction was formed by laminating a liner to the adhesive side of adhesive-coated reflective sheeting. Rolls were prepared by either hand wrapping or machine wrapping each construction around a cardboard core of about 3 inches (7.6 cm) diameter with the liner on the inside of the roll. The construction was cut, and the outer wrap was taped to the roll to maintain a tightly wrapped roll.

For the hand wrapped rolls, constructions of about 1 meter wide by 3 meters long in the machine direction were tightly hand wrapped around the core in machine direction with respect to the direction the substrate was manufactured. For machine wrapped rolls, constructions of about 1 meter wide by about 10 to 25 meters in length in the machine direction were wrapped onto the core by first mounting the construction on the unwind end of a rewind machine. The construction was then threaded through the machine, taped to the core on the winder spindle at the opposite end of the machine and wound in the machine direction onto the core.

The wrapped rolls were stored in various test environments for various amounts of time. The test conditions used were 150° F. (66° C.) oven for 24 hours ("150"); 120° F. (49° C.) oven for 3, 10 or 22 days ("120/3; 120/10; 120/22") or 90° F. (32° C.)/90% relative humidity for 34 days ("90/90").

The rolls were removed from the test environment and allowed to equilibrate at room temperature, unwrapped, inspected and rated for general appearance and wrinkling. Visual defects of each construction on the side of the liner adjacent the adhesive were rated from 1 to 5 as described below:

1. Smooth; no defects.
2. Slight roughness; no wrinkles.
3. Very rough; "golf ball" appearance beginning to form.
4. Distinct golf ball effect; several individual cells have distorted; minor wrinkle may be starting to form.
5. Several individual cells have distorted; adjacent cells have distorted to form small wrinkles; large wrinkles can be seen in some areas.

Release

"Release Test Method A"

Peel force was performed on constructions of about 2.5 cm wide by about 20 cm long. Each liner/adhesive/polyolefin film construction was adhered to a 7 cm wide by 28 cm long aluminum panel (6061T6 alloy with etch and desmut surface from Q Panel Company, Cleveland, Ohio) using double sided adhesive tape. The exposed adhesive of the double sided tape was placed on the aluminum panel and laminated to the panel by running a rubber coated, 5 cm wide roller back and forth along the length of the adhesive strip twice using hand pressure. The release liner was removed from the double sided tape and the polyolefin film side of the liner/adhesive/polyolefin film construction was laminated to the double sided tape on the test panel using a rubber roller as detailed above. The aluminum panel was clamped on the sliding stage which was clamped in the lower jaw of a Sintech 1 Tensile Testing apparatus commercially available from MTS, Eden Prairie, Minn. About 5 cm of the liner was peeled back from the liner/adhesive/polyolefin film construction and clamped in the upper jaw of the tensile testing apparatus. The liner was separated from the adhesive of the liner/adhesive/polyolefin film construction at a 90 degree peel angle using a crosshead speed of 30 cm/minute. The peel force was recorded in grams/2.5 cm over a length of at least 10 cm and the average peel force was obtained for 3 replicates.

"Release Test Method B"

The release values were measured according to ASTM D3330/3330M, Test Method A, Volume 15.09, Summary 1.1.1.

TABLE I

Liners Used in the Examples

| Liner | Description of Release Liner | COF |
|---|---|---|
| 1 | Liner on "Scotchlite High Intensity Grade Reflective Sheeting Series 3870", commercially available from 3M in the USA, having a polyolefin backing and a liner thickness of 3 mils (0.076 mm) | 0.12 |
| 2* | Liner on "Scotchlite High Intensity Grade Reflective Sheeting Series 3870", commercially available from 3M in the USA, except the release coating was replaced with the silicone coating described below (polyolefin backing, 3 mils) | 0.51 |
| 3 | "Nat 3.0; HD Silox H1K/0", commercially available from International Paper Akrosil Division, Menasha, WI, having a high density polyethylene backing and a liner thickness of 3 mils (0.076 mm) | — |
| 4 | "PET 1-2 PESTR(NAT) 8000A(1N)", commercially available from DCP-Lohja Inc., Willowbrook, IL, having a polyethylene terephthalate backing and a liner thickness of 2 mils (0.05 mm) | — |
| 5 | Liner on reflective sheeting commercially available from 3M under the trade designation "Scotchlite Diamond Grade VIP Reflective Sheeting Series 3990" commercially available from 3M in the USA, having a polyolefin backing and a liner thickness of 3.2 mils (0.081 mm) | 0.53 |
| 6 | Liner on "Scotchlite High Intensity Grade Reflective Sheeting Series 3870", commercially available from 3M in Europe, having a polyolefin backing and a liner thickness of 3 mils (0.076 mm) | — |

*Liner 2 was prepared with a cast film process resulting in a 3 mil (75 micron) thick backing. A polypropylene copolymer, commercially available from Huntsman Corporation, Salt Lake City, UT under the trade designation "Huntsman P6M4Z-007" was extruded with a single screw extruder at 450° F. (232° C.) through a flat film extrusion die. The resin was quenched with a chilled three-roll stack at a rate of 250 ft/min (76 m/min).

The chill rolls had the temperatures of 50° F.(10° C.), 150° F.(66° C.), and 150° F. (66° C.), respectively with each roll having a diameter of 17.75 inches(45 cm). The backing was treated with air corona to achieve a surface energy on the order of 40–60 dynes/cm. The treated surface was further coated with the solution of 85 parts of silanol terminated PDMS, 15 parts of bistriethoxysilyloctane, and 2 parts of dodecylphenyl iodonium hexafluoroantimonate in a 80/20 blend of heptane and methyl ethyl ketone. The solution was applied by a gravure coater and dried in an air flotation oven to a dry coating weight of approximately 0.7 g/m$^2$. The release coating was cured by passing under medium pressure mercury lamps with an exposure energy of between 15 and 20 mJ/cm$^2$.

Examples 1–4 and Comparative Examples A–D

Examples 1–4 and Comparative Examples A–D were prepared using "Scotchlite High Intensity Grade Reflective Sheeting Series 3870" commercially available from 3M in the USA without the adhesive or liner as the substrate, referred to as "Sheeting 3870" hereafter in the examples unless specified otherwise. An adhesive and the liner of TABLE I, as indicated by Table II, were laminated to Sheeting 3870 using either a "Liner Exchange" method or a "Direct Coat" method.

When the direct coat method was used, a solventless, tackified acrylate adhesive was coated onto the liner at a thickness of 0.08 mm (3 mils). The adhesive was cured using an EB apparatus commercially available from Energy Sciences, Inc., Wilmington, Mass. under the trade designation "Electrocure Series" (System 7961, Model EC300/134/400) with a dosage of 8 Mrads at 200 Kev. The adhesive-coated liner and Sheeting 3870 were fed through two nip rollers to laminate the adhesive to the sheeting.

When the liner exchange method was used, a solvent-based, tackified acrylate adhesive was coated onto a silicone coated paper carrier web at an adhesive coating thickness of about 3 mils (75 microns). The adhesive-coated liner was run through a four zone oven (Zone 1=250–260° F. [121° C.–127° C.], Zone 2=300–315° F. [149° C.–157° C.], Zone 3=350–355° F. [177° C.–179° C.], Zone 4 heat off) at a rate of about 15 meters per minute to remove the solvent and thermally crosslink the adhesive. The adhesive-coated carrier web and the sheeting were fed through two nip rollers to laminate the adhesive-coated carrier web to the sheeting. The carrier web was then removed from the laminate and the liner was laminated to the adhesive-coated sheeting by feeding the liner and the adhesive coated sheeting through two nip rollers.

The processing conditions were chosen such that the liner/adhesive/substrate exhibited a rating of "1" with respect to the Roll Stability test prior to testing. Rolls of each liner/adhesive/substrate construction were wound on a core by either hand wrapping ("Hand Wrap") or machine wrapping ("Machine Wrap"), evaluated and rated using the Roll Stability Test Method, as previously described. The results are reported in Table II.

In general, the severity of roll defects tends to increase with increasing temperature. Accordingly, if the sample failed at 90° F. (32° C.), for example, one can conclude that the sample will also fail at higher temperatures. The data in TABLE II shows that Liner 2 exhibited significantly better roll stability than Liner 3, Liner 5 or Liner 6 at all test conditions.

Example 5 and Comparative Examples

The thermal expansion and shrinkage of various liners in comparison to the substrate (Sheeting 3870 with adhesive) were measured in attempt to correlate such physical properties to the observed roll stability.

Example 5 (Liner 1 and 2) and the comparative examples (Liners 3–6 and Sheeting 3870 with adhesive) were prepared by independently cutting and testing a sample using the thermal expansion test method described above.

FIG. 1 is a plot of L/LO (where L is the sample length in mm as a function of temperature and LO is the initial sample length in mm) multiplied by 100 versus temperature in ° C. FIG. 1 shows that Liner 6 exhibited a thermal expansion closest to that of Sheeting 3870, yet Liner 6 exhibited poor roll stability, per Table II. Liner 1 and 2, having a thermal expansion less similar to Sheeting 3870 in comparison to Liner 6, exhibited good roll stability. Accordingly, the data and FIG. 1 show that in contrast to the teachings of WO/14281, there was no correlation between thermal expansion and roll stability.

Two samples of each of Sheeting 3870 with adhesive and the indicated liners were prepared for shrinkage evaluation by independently cutting a sample as described above for thermal expansion measurement testing. One sample of each was evaluated according to the "Shrinkage Test Method A" as detailed above. A second sample was evaluated according to the "Shrinkage Test Method B" as detailed above.

Figure 2:
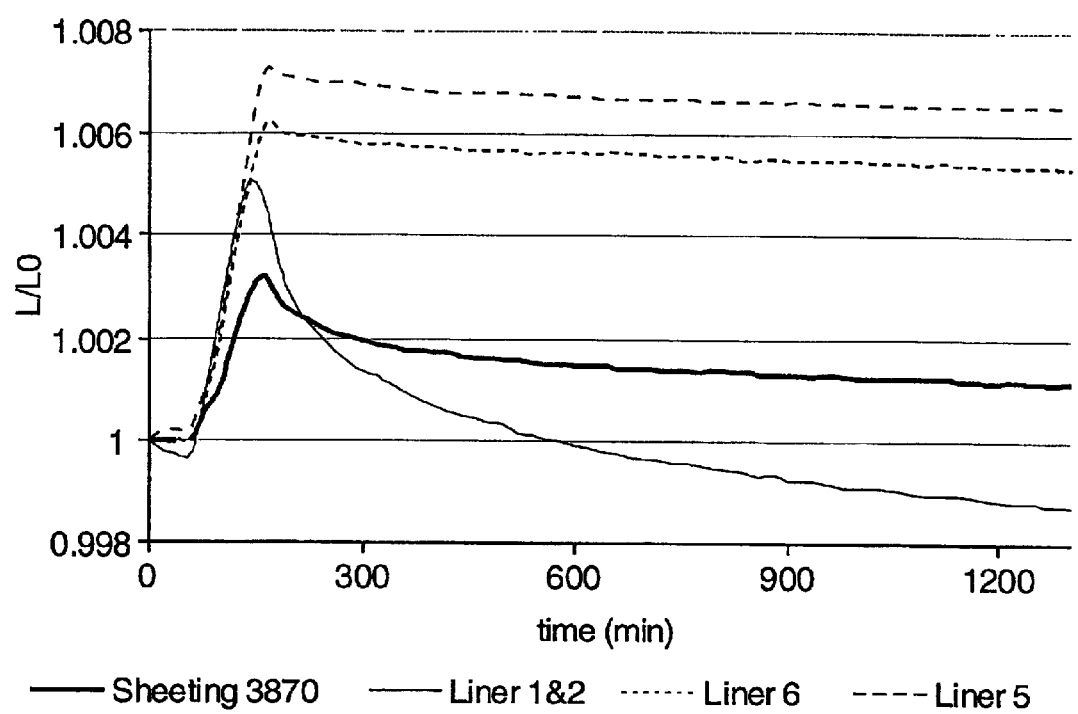
FIGS. 2 and 3 depict the shrinkage of Liners 1 and 2, Liner 5 and Liner 6 in comparison to an adhesive coated substrate, "Sheeting 3870".

FIG. 2 is a plot of the measurements using "Shrinkage Test Method A". The figure is a plot of L/LO (where L is the sample length in mm at a given time and LO is the initial sample length in mm) versus time in minutes.

Figure 3:
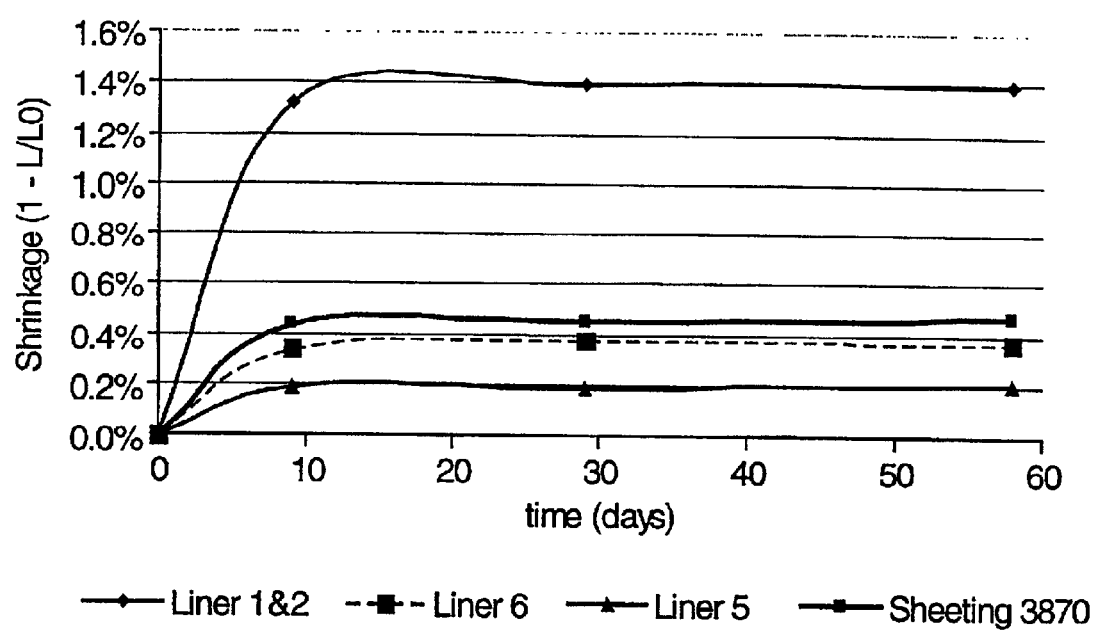

FIG. 3 is a plot of the measurements using "Shrinkage Test Method B". The figure is a plot of 1-L/LO (where L is the sample length in mm at a given time and LO is the initial sample length in mm) versus time in days. In FIG. 3, the shrinkage was measured over a longer period of time than the data plotted in FIG. 2.

TABLE II

| Ex. No. | Liner | Adhesive Application Method | Roll Preparation Method | Roll Stability Rating at Test Condition | | | | |
|---|---|---|---|---|---|---|---|---|
| | | | | 150 | 120/3 | 120/10 | 120/22 | 90/90 |
| Comp. A | 5 | Direct Coat | Hand Wrap | 5 | — | — | — | — |
| Comp. B | 3 | Liner Exchange | Hand Wrap | 5 | — | — | — | — |
| Ex. 1 | 2 | Direct Coat | Machine Wrap | 2–2.5 | 1 | 1.5 | 2 | — |
| Comp. C | 6 | Liner Exchange | Machine Wrap | 4 | 3.5 | 5 | 5 | — |
| Ex. 2 | 2 | Liner Exchange | Machine Wrap | 1.5 | 1 | 2 | 2 | — |
| Comp. D | 6 | Liner Exchange | Machine Wrap | — | — | — | — | 4 |
| Ex. 3 | 2 | Direct Coat | Machine Wrap | — | — | — | — | 1.5 |
| Ex. 4 | 2 | Liner Exchange | Machine Wrap | — | — | — | — | 1 |

Both FIGS. 2 and 3 show that Liner 1 and 2 exhibited greater shrinkage than Sheeting 3870 with adhesive and Liner 5 and Liner 6 exhibited less shrinkage than Sheeting 3870 with adhesive. Accordingly, there is a correlation between shrinkage and roll stability that distinguishes Liner 6 from Liners 1 and 2. Based on the shrinkage results depicted in FIGS. 2 and 3 in combination with the roll stability rating reported in Table II, the Applicants concluded that only liners having a shrinkage greater than or substantially the same as the substrate exhibit good roll stability.

Example 6 and Comparative Example E

Liner 1 and Liner 2 were each independently coated with a solventless acrylate adhesive at a thickness of 0.1 mm (5 mils). The adhesive coated on Liner 1 was a 93/7 isooctyl acrylate/acrylic acid ("IOA/AA"). The adhesive on Liner 2 was a 95/5 IOA/AA with 12 wt- % of a tackifier, commercially available from Hercules, Wilmington, Del. under the trade designation "Foral 85". Both adhesives were hot melt coated onto the liner using a twin screw extruder and a rotary rod die.

The adhesive surface of each adhesive-coated liner was laminated to a 0.08 mm thick polyolefin film. The adhesive was crosslinked by EB curing through the polyolefin film using Model CB 300/45/380 commercially available from Energy Sciences, Inc., Wilmington Mass. with a dosage of 3, 6 and 9 Mrads, respectively at 225 Kev.

The release value of the adhesive from each liner at each EB irradiation dosage was evaluated according to Release Test Method A, as previously described, as reported in Table III.

The data shows that although both Liner 1 and 2 exhibited good roll stability, Liner 2 exhibits undesirably high release values when exposed to EB curing. The tackified adhesive used on Liner 2 would be expected to give higher release numbers than the untackified adhesive used on Liner 1. However, the results show the significantly lower release values obtained with Liner 2 in spite of the fact that a tackified adhesive was used.

TABLE III

| Ex. No. | Liner | Release Value at EB Irradiation Dosage (Mrads) | | |
|---|---|---|---|---|
| | | 3 | 6 | 9 |
| Comp. E | 1 | 76 | 126 | 180 |
| Example 6 | 2 | 20 | 33 | 43 |

Examples 7–12 and Comparative Example F

Examples 7–12 were prepared by coating a silicone composition on a backing. Six silicone compositions were prepared by admixing a vinyl terminated polydimethyl siloxane ("PDMS"; VMe$_2$SiO(SiMe$_2$O)$_n$SiMe$_2$V) of (n) value as set out in TABLE IV, a stoichiometric equivalent of crosslinker commercially available from Dow Corning Corporation, Midland, Mich. ("Dow") under the trade designation "Syl-Off 7048", and 50 ppm of platinum catalyst commercially available from Dow under the trade designation "Syl-Off 7127".

The silicone compositions were prepared by the method of siloxane re-equilibration described in U.S. Pat. No. 5,520,978 at Column 8, line 38.

Each release coating composition was coated on a backing that was a primed polyethylene terephthalate ("PET") film commercially available from Mitsubishi Polyester, Greer, S.C. under the trade designation "Hostaphan" to provide a release-coated liner construction. Each release-coated liner construction was cured in a 150° C. for 5 minutes, resulting in a dry coating thickness of about 0.5 micrometer.

A seventh release-coated liner construction was a liner commercially available from Loparex Inc. (formerly Daubert or DCP), Bedford, Ill. under the trade designation "1-803KG-1E". The release coating was a tin catalyzed solvent based silicone composition.

A 0.1 mm (5 mil) thick adhesive composition consisting of 69% of 93/7 IOA/AA and 31% "Foral 85" was coated onto a standard commercially available silicone release liner. The adhesive on the standard liner was then transferred to the release-coated surface of each release-coated liner construction in TABLE IV by first stripping off the standard liner and then room temperature laminating between two rubber rolls the adhesive to the release-coated liner construction in TABLE IV. The adhesive on the release-coated liner construction was then cured through the exposed adhesive using an EB apparatus commercially available from Energy Science Inc., Wilmington, Mass. under the trade designation "Model CB-300" with a dosage of 7 Mrads at 225 Kev.

Set out below in Table IV are the theoretical degree of polymerization ((n) value) of the PDMS, the COF determined using the COF Test Method and the release value measured using Release Test Method B, as described above.

The data in TABLE IV show that the release-coated liner constructions of Examples 7–12 in accordance with the present invention have a high COF and provide significantly lower release values than the release-coated liner constructions of Comparative Example F which has a low COF. Upon exposure to EB curing, the adhesive composition of Comparative Example F resulted in a high release value of the liner from the adhesive. These test results also explain the findings of Comparative Example E, since Liner 1 was also found to have a high COF, of 0.51, as reported in Table I.

TABLE IV

| Ex. No. | (n) Value of the PDMS | COF | Release Value (g/2.5 cm) |
|---|---|---|---|
| Example 7 | 55 | 0.8 | 22.3 |
| Example 8 | 100 | 0.6 | 31.7 |
| Example 9 | 200 | 0.6 | — |
| Example 10 | 470 | 0.5 | 42.5 |
| Example 11 | 900 | 0.4 | 69.6 |
| Example 12 | 3300 | 0.3 | 154.2 |
| Comp. F | ~5000 | 0.2 | 427 |

Comparative Examples G–P

The COF of various release-coated liners on commercially available encapsulated lens retroreflective products was measured. The liner was removed from the product and the COF measured using the COF Test Method described above, except that the platform of the Model SP-2000 Slip/Peel Tester was set in motion at a speed of 30.5 cm/min (12 in/min) instead of 15 cm/min.

The data in TABLE V show that all the liners measured had a relatively low COF, namely 0.24 or less. Thus, these liners employed on commercially available sheeting would be expected to exhibit unacceptably high release values upon removal of the liner from an adhesive that had been EB cured.

TABLE V

| Ex. No. | Retroreflective Sheeting (Manufacturer) | Trade Designation | COF |
|---|---|---|---|
| Comp. G | American Traffic Safety Marketing Inc.(Orange Park, FL) | "3824 II" | 0.21 |
| Comp. H | Lucky Gold Star (Seoul, Korea) | "8000 Series White" | 0.22 |
| Comp. I | Lucky Gold Star (Seoul, Korea) | "8000 Series Blue" | 0.23 |
| Comp. J | Nippon Carbide Industries Company Incorporated (Tochigig-ken, Japan) | "800-12" | 0.16 |
| Comp. K | Nippon Carbide Industries Company Incorporated (Tochigig-ken, Japan) | "800-4" | 0.14 |
| Comp. L | Lucky Gold Star | "8000 Series Red" | 0.21 |
| Comp. M | Lucky Gold Star | "8000 Series Green" | 0.24 |
| Comp. N | Lucky Gold Star | "8000 Series Yellow" | 0.21 |
| Comp. O | Kiwa Chemical Industry Company Ltd. (Wakayame, Japan) | "22013 White" | 0.14 |
| Comp. P | American Traffic Safety Marketing Inc. | "3870" | 0.23 |

What is claimed is:

1. An article comprising an adhesive layer disposed between retroreflective sheeting and a polymeric liner, the liner having an adhesive-facing surface releasably adhered to the adhesive;

wherein the adhesive-facing surface has a coefficient of friction of at least about 0.30;

the retroreflective sheeting exhibits shrinkage such that (1-L/LO) is greater than 0.05% at 10 days according to Shrinkage Test Method B;

and the liner exhibits shrinkage at 10 days according to Shrinkage Test Method B ranging from substantially the same as to greater than the retroreflective sheeting.

2. The article of claim 1 wherein the article exhibits good roll stability such that the article is smooth and free of wrinkles.

3. The article of claim 1 wherein the retroreflective sheeting has a force per unit width of at least two to three times greater than the liner.

4. The article of claim 1 wherein the retroreflective sheeting has a force per unit width of at least $1\times10^3$ Newtons/cm greater than the liner.

5. The article of claim 1 wherein the retroreflective sheeting has a force per unit width of at least $1\times10^4$ Newtons/cm greater than the liner.

6. The article of claim 1 wherein the coefficient of friction is at least about 0.40.

7. The article of claim 1 wherein the coefficient of friction is at least about 0.45.

8. The article of claim 1 wherein the coefficient of friction is at least about 0.50.

9. The article of claim 1 wherein the adhesive is a heat-stable adhesive.

10. The article of claim 1 wherein the adhesive is crosslinked.

11. The article of claim 1 wherein the adhesive is acrylate based.

12. The article of claim 1 wherein said adhesive is substantially fine of photoinitiator.

13. The article of claim 1 wherein the retroreflective sheeting comprises polymethylmethacrylate.

14. The article of claim 1 wherein the retroreflective sheeting comprises an enclosed-lens, an encapsulated lens, or cube-corner construction.

15. The article of claim 1 wherein the retroreflective sheeting comprises an encapsulated lens construction.

16. The article of claim 1 wherein the release liner comprises a backing and a release coating compositions on said adhesive-facing surface wherein said release coating composition comprises a cure-on-demand moisture curable composition having reactive silane functionality.

17. The article of claim 16 wherein the moisture-curable compositions comprises a compound comprising molecules bearing reactive silane functional groups and an acid generating material that is free of ammonium salt.

* * * * *

UNITED STATES PATENT AND TRADEMARK OFFICE
CERTIFICATE OF CORRECTION

PATENT NO.   : 6,805,933 B2
DATED        : October 19, 2004
INVENTOR(S)  : Patel, Suman K.

It is certified that error appears in the above-identified patent and that said Letters Patent is hereby corrected as shown below:

Column 8,
Line 1, delete "(Bums)" and insert -- (Burns) --, therefor.

Column 20,
Line 22, delete "fine" and insert -- free --, therefor.

Signed and Sealed this

First Day of February, 2005

JON W. DUDAS
*Director of the United States Patent and Trademark Office*